United States Patent [19]

LaBianca

[11] Patent Number: 5,071,340
[45] Date of Patent: Dec. 10, 1991

[54] COOLING ARRANGEMENT FOR VALVE STEM GATES IN HOT RUNNER INJECTION MOLDING MACHINE SYSTEMS

[75] Inventor: Vincent S. LaBianca, Cranston, R.I.
[73] Assignee: Dart Industries Inc., Deerfield, Ill.
[21] Appl. No.: 487,690
[22] Filed: Mar. 2, 1990
[51] Int. Cl.⁵ .............................................. B29C 45/74
[52] U.S. Cl. ................................... 425/548; 137/340; 164/304; 264/297.2; 264/328.15
[58] Field of Search ............... 425/548, 549, 547, 565, 425/570, DIG. 229; 264/328.15, 328.9, 297.2, 328.14, 297.2; 164/304, 312; 137/340

[56] References Cited

U.S. PATENT DOCUMENTS

| | | | |
|---|---|---|---|
| 2,828,509 | 4/1958 | Schmucker | 425/549 |
| 4,125,352 | 11/1978 | Gellert | 425/566 |
| 4,173,448 | 11/1979 | Rees et al. | 425/549 |
| 4,268,240 | 5/1981 | Rees et al. | 425/548 |
| 4,306,852 | 12/1981 | Mateev et al. | 425/490 |
| 4,311,185 | 1/1982 | Zimmerman | 164/312 |
| 4,438,064 | 3/1984 | Tsutsumi | 264/328.15 |
| 4,588,367 | 5/1986 | Schad | 425/569 |
| 4,657,496 | 4/1987 | Ozeki et al. | 425/130 |
| 4,662,837 | 5/1987 | Anderson | 425/548 |
| 4,687,613 | 8/1987 | Tsutsumi | 264/328.15 |
| 4,705,473 | 11/1987 | Schmidt | 264/328.15 |
| 4,747,770 | 5/1988 | Schmidt | 425/549 |
| 4,755,131 | 7/1988 | Schmidt | 425/549 |
| 4,894,197 | 1/1990 | Tsutsumi | 264/297.2 |
| 4,917,594 | 4/1990 | Gellert et al. | 425/549 |
| 4,938,681 | 7/1990 | Gellert | 264/328.9 |

OTHER PUBLICATIONS

Kona Bulletin 001, Kona Corporation, Kona Super Heat Conductors, p. 1.
Kona Bulletin 002, Kona Corporation, Heat Pipe Technology, ©1979 printed 4/81, pp. 1-4.
Huskey Injection Molding Systems Ltd., Hot Runner Systems, ©1985, Whole Book.
Injection Molding Handbook, D. V. Rosato, Heat Transfer by Heat Pipes, ©1986, p. 196.

Primary Examiner—Willard E. Hoag
Attorney, Agent, or Firm—Leigh B. Taylor

[57] ABSTRACT

An injection molding machine and method in which a hot runner has heated nozzles and piston operated nozzles valves, the stems of the nozzle valves and the nozzle bushings have passages connected to the cylinders to carry such as to carry cooling fluid to the cylinders to actuate the nozzle valves.

14 Claims, 2 Drawing Sheets

COOLING ARRANGEMENT FOR VALVE STEM GATES IN HOT RUNNER INJECTION MOLDING MACHINE SYSTEMS

FIELD OF INVENTION

The present invention relates to an injection molding machine of the hot-runner type. A hot-runner mold is designed and functions to eliminate waste plastic that is traditional created by in the typical injection molding process. More particularly, this invention relates to a cooling arrangement for the valve stems and gates common to hot runner structures.

BACKGROUND OF THE INVENTION

Hot runner injection molding and molds have been available and successfully employed since the 1950's. Of course during this period, the plastic materials molded have been those commonly accepted as suitable for injection molding processes. For example polyethylene, polypropylene, blends of pylyethylene/polypropylene, polycarbonates and others well known in the molding art. These materials had and have very comparable characteristics (i.e. melt ranges, flow conditions, etc.) all which lend themselves to the injection molding process. Plastic materials engineering has however made significant advances since the mid 1970's. Whole new classes of polymers known as engineering, high-temperature and high-strength plastics, elastomers and liquid crystal polymers, have appeared and created whole new product categories. However, economical processing of these materials is a necessary adjunct to the successful adoption of them for use in broad product fields or categories.

Therefore, it was expected that injection molders would begin experimentation with these new materials and seek to develop successful processes and apparatus to accomplish these uses.

SUMMARY OF THE INVENTION

Recalling that the new materials referred to above may require high temperature processing and that this invention relates to the cooling of valve stems and gates in hot runner molds, this invention describes and illustrates an apparatus and method easily adaptable to hot runner molding systems and devices that lend such systems to the improved processability of high temperature polymers.

Typical hot runner systems to which this invention relates can be found depicted in U.S. Pat. Nos. 4,173,448; 4,268,240; 4,588,367; 4,657,496; and 4,662,837 are commonly available from Husky Injection Molding Systems of Canada.

High temperature polymers typically require that the polymers as they flow through the injection molding machines and into the attendant molds will be at between 600 and 800 F. With such extreme temperatures it was found that molded products would be burned in the sprue gate area. Further, it was common for these products to also delaminate over relatively wide areas adjacent the gate area. This too was attributable to the extreme of localized heating in this area of the mold.

Even after gate bushings were modified to include water cooling it was common for gate valve seat temperatures to approach 400 F and the mold temperature adjacent the gate to approximate 275 F. However the water cooling of the gate area does alleviate the burning and delamination except immediately adjacent the gate valve seat.

In order to achieve the necessary cooling effect it became apparent that the gate valve seat area would have to be cooled directly. Accordingly, a major component of this invention relates to the cooling the gate valve seat area in hot runner system and the manner in which that is accomplished. To that end and in this invention the valve stem of the gate valve is adapted to internally receive a sparging tube that is adapted to deliver cooling fluid to the stem tip and valve seat areas. Furthermore, the cooling fluid is contemplated, in the preferred embodiment, as being the same fluid as is used in and operates the piston to alternately move the valve stem from its closed to open to closed positions.

OBJECTS OF THE INVENTION

An object of the present invention, therefore, is to provide an improved gate valve construction for injection molding machine hot runner systems.

Another object of the invention is to provide an easily adaptable and cost effective modification for the conventional hot runner gate valve apparatus.

A further objective of the invention is to provide a method of molding high-temperature plastic materials by the injection molding method.

BRIEF DESCRIPTION OF THE DRAWINGS

The above and other features and objectives of the invention will now be described in detail with reference to the accompanying drawing in which:

FIG. 3 is a broken enlarged cross-sectional view of the valve stem tip showing a modified version there of.

SPECIFIC DESCRIPTION

Figure 1:
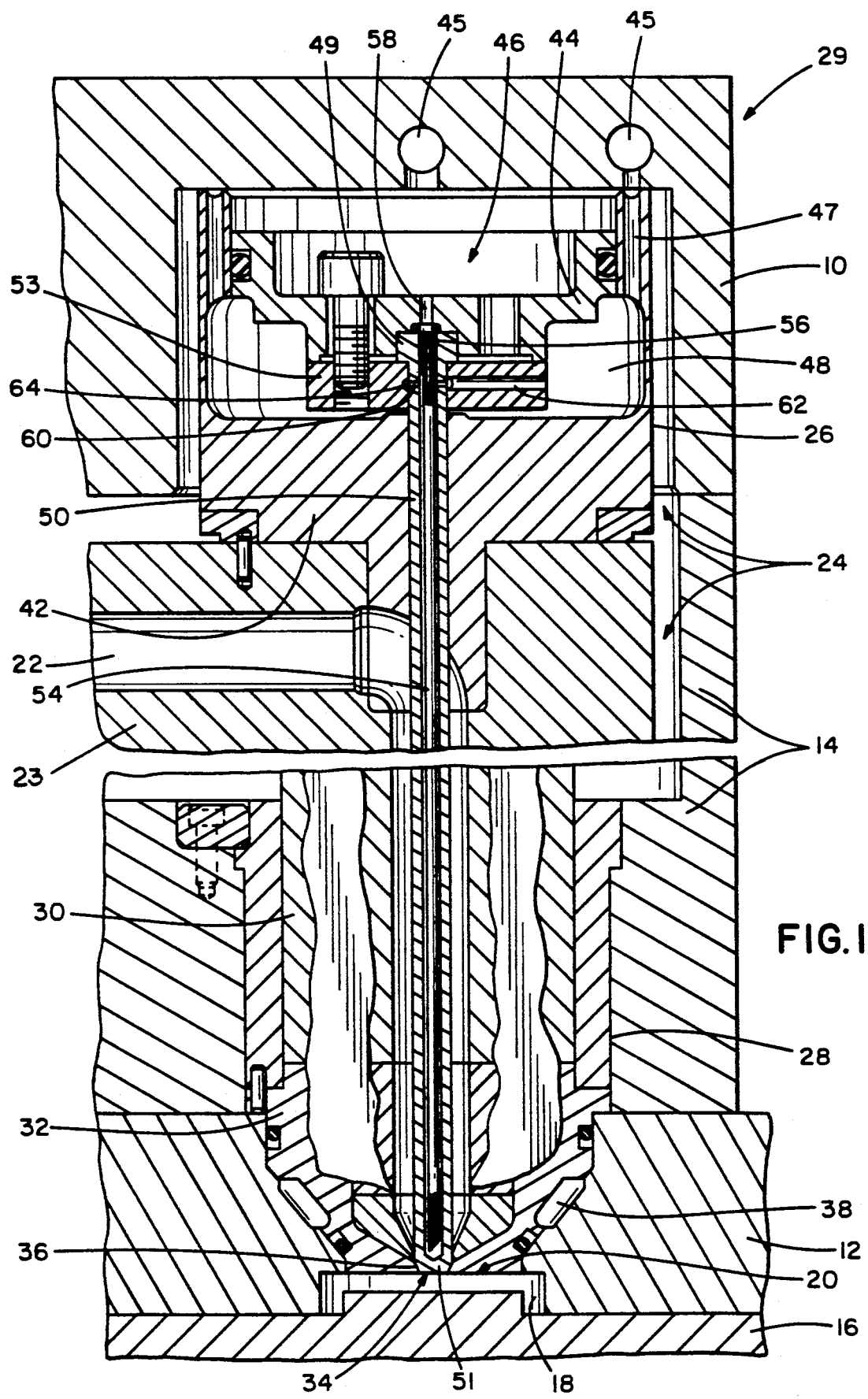
FIG. 1 is a broken cross-sectional view of a typical hot runner system valve incorporating the cooling means and method comtemplated by the invention.

Turning to the drawings, and in particular FIG. 1 depicted is a manifold plate 10 separated from a stationary mold plate 12 by the backing plate 14. Stationary mold plate 12 cooperates with movable mold plate 16 typically defining a plurality of mold cavities 18, only one of which is illustrated. Each of these cavities 18 is individually accessible through a gate, generally seen at 20 and is adopted to receive liquefied plastic material from any suitable injection molding machine not shown. The plastic is forced through sprue channel(s) 22 in distribution plate 24 and backing plate 14 to the gate area 20.

The hot-runner structure embodying the invention is comprised of manifold plate 10, backing plate 14 and distribution plate 22 and is further comprised of a valve generally seen at 24, which includes a piston/cylinder arrangement 26 and nozzle 28. Together these elements form valve member 29. The nozzle 28 is typical to those of conventional hot runner systems as may be seen in U.S. Pat. No. 4,173,448. Included in such structures are the nozzle housing 30 which positions and supports gate bushing 32 in gate 20 of stationary mold plate 12. Bushing 32 has an opening at 34 which forms a valve seat 36. Additionally in the preferred embodiment mold plate 12 and gate bushing 32 are, in their assembled relationship, adapted to form a coolant channel 38.

Turning now to the mechanism which selectively opens and/or closes the valve, attention is redirected to the piston/cylinder arrangement 26. That assemblage is made up of a cylinder 40 formed in valve bushing 42. Piston 44 is adapted for axial movement in cylinder 40 and when positioned therein creates the fluid (i.e. air) chambers 46 and 48 respectfully. Piston reciprocation is achieved by alternately introducing a fluid medium at ambient temperatures into chambers 46 and 48 through the channels 45 in manifold plate 10 and, in the case of chamber 48, also through openings 47 in piston 44. Accordingly, that medium serves as the activant for piston 44.

The proximal end 49 of valve stem 50 is suitably affixed to piston 44 ys for example by means of a valve stem retainer 53. Stem 50 of course, moves with piston 44 in valve bushing 42 and a portion of sprue channel 22. The distal end 51 of stem 50 is adapted to mate with valve seat 36 when valve 24 is closed, as it is in FIG. 1.

In the preferred embodiment of the invention valve stem 50 is provided with a cavity 52 extending axially along the stem. A cooling tube 54 is positioned in and in spaced relationship to the cavity 52; being supported there by a brazed or other suitable connection means as at 56 and as may be better seen in FIGS. 2 and 4. The cooling tube 54 is, of course, hollow and opens to the cavity 52 proximate the distal end 51 of stem 50. Likewise, the tube 54 is open at the proximal end 49 of stem 50 and is connected to fluid chamber 46 by means of connecting passage 58 in piston 44. Cavity 52 is similarly connected to fluid chamber 48 by means of one or more fluid passages 60 in stem 50 which aligns with passageway 62 in piston 44. Note that piston 44 is also grooved as at 64 to accommodate fluid flow through the passages 60 to passage way 62 regardless of the relative operational position of valve stem 50 and piston 44.

Figure 3:
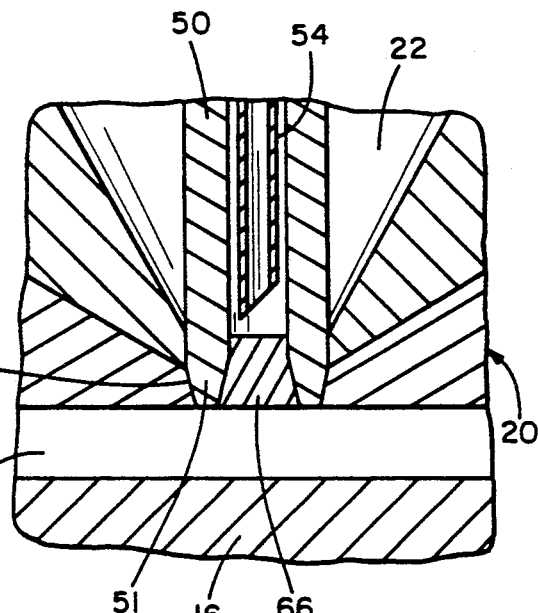
Figure 4:
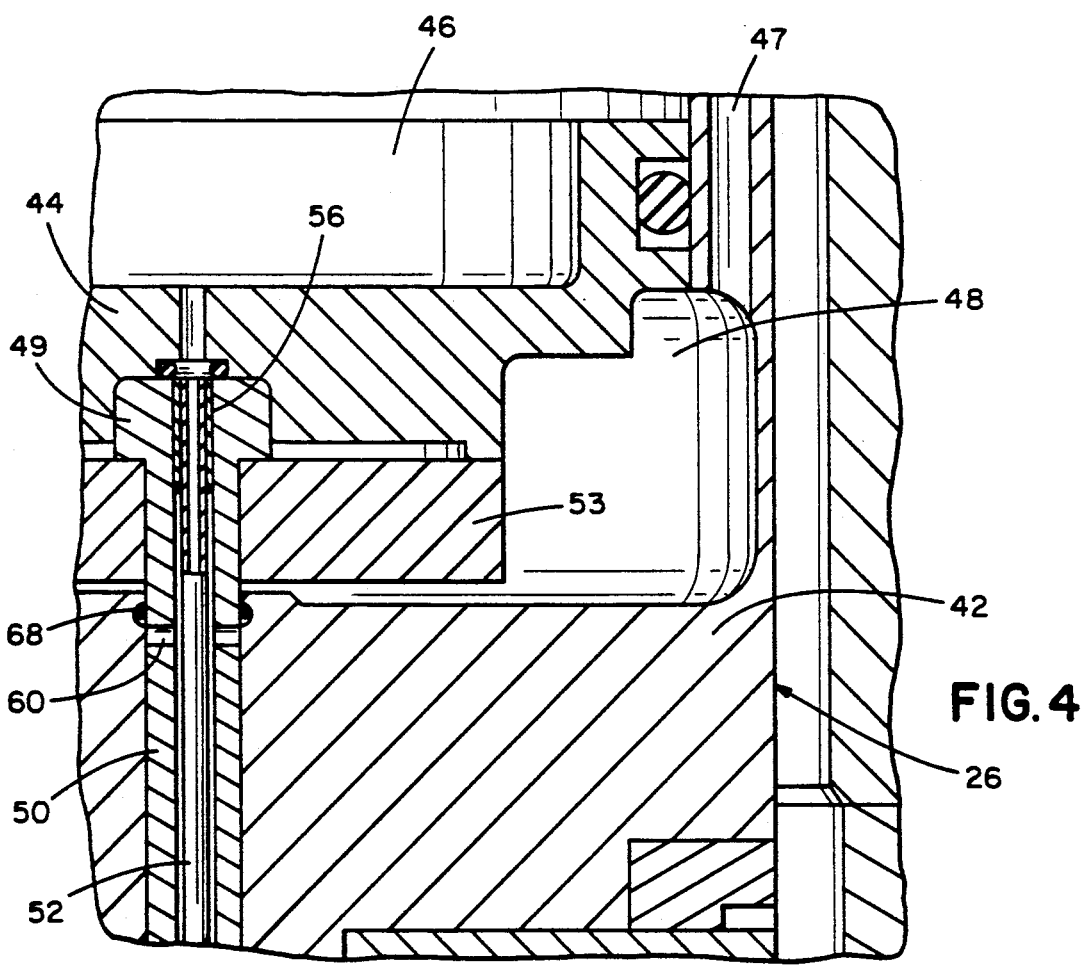
FIG. 4 is a broken enlarged cross-sectional view of another embodiment of the invention and again particularly showing the joinder between the gate valve stem with the piston.

In operation the injection molding machine to which the illustrated hot runner system and product mold(s) are attached will provide a liquefied plastic materials to the mold cavity 18 through sprue channel(s) 22. In the closed position of the valve 29 as is illustrated in FIGS. 1, 3 and 4 piston 44 is positively displaced by the introduction of an ambient or cooled fluid under pressure into chamber 46. Portions of that fluid, due to the construction described above, continuously traverses through connecting passage 58, into and through cooling tube 54. Accordingly there is a continuous stream of fluid being discharged from tube 54 in such fashion that it impinges upon the inner surfaces of stem cavity 52 at the distal end of stem 50 to significantly dissipate heat from tip of stem at 51. This then functions as a significant dissipator of heat from the gate area 20 and valve seat 36 and product area 34.

Fluid flow thereafter continues back within stem cavity 52, lending a further cooling effect to the stem as a whole, and exits cavity 52 through passages 60, passageway 62, chamber 48 and channel 45.

As can be readily appreciated from the foregoing, when valve 29 is opened to introduce liquefied plastic to the cavities 18 piston actuating fluid flows are reversed. Thus, the ambient or cooled fluid under pressure will be introduced to chamber 48 driving piston 44, upwardly (as depicted in the drawings) and opening valve 29 by displacing the distal end 51 of stem 50 away from valve seat 36 and into the sprue channel 22.

Simultaneously cooling fluid is introduced to the cavity 52 in which it flows to the distal end 51 of stem 5 and into cooling tube 54. The fluid thereafter exits through tube 54, connecting passage 58, chamber 46 and channel 45.

Therefore, in both the open and closed positions of the preferred embodiment of valve 29, cooling fluid is circulated within valve stem 50. In conjunction with the cooling obtained by the use of coolant channel 38, this effectively lowers the metal temperatures to levels consistent with overcoming the problems set forth above respecting the molding of certain high temperature plastic materials. And, of course, depending upon material operating temperatures stem cooling alone may be sufficient to overcome the stated problem.

Figure 2:
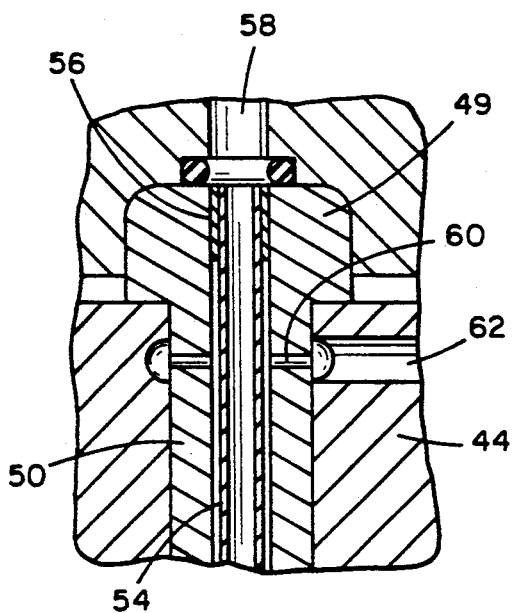
FIG. 2 is a broken enlarged cross-sectional view of the gate valve stem of FIG. 1 depicting the area of its joinder with the hot runner gate valve piston.

FIG. 2 is an enlargement of the proximal end 49 of valve stem 50 better showing the relationships and attachments between valve stem 50, cooling tube 54 and the fluid passageways 58 and 62.

FIGS. 3 and 4 show two varients that may be employed in the practice of the invention. As shown in FIG. 3, for example, if it is desired to improve conductivity one may alter the distal end 51 of stem 50 by providing a plug 66 of high heat transfer material, for example, beryllium copper. This will further enhance the cooling effect of the fluid medium circulating through stem 50 due to the better heat transmission capability of the plug material.

In a further embodiment as shown in FIG. 4 by repositioning passages 60 axially along stem 50, "one way" only fluid flow can be achieved. Accordingly, as can be seen from FIG. 4 when the valve 29 is closed as shown there (i.e. fluid pressure is available to chamber 46), movement of fluid through cooling tube 52 and stem 50 is prevented due to the closure of passages 60 by valve bushing 42 and the O-ring seal 68. Of course when chamber 48 is pressured, passages 60 move into communication with that chamber and fluid flow through stem 50 and cooling tube 52 etc. is continuous until valve closure is again effected.

Such a configuration results in active cooling on an intermittent basis only but this may be desirable under certain conditions.

EXAMPLE 1

In one condition of molding machine operation processing plastic it was necessary maintain molten plastic heats approximating 700 F in the sprue channel 22. Employing the embodiment of the invention as shown in FIG. 1, ambient air being the activant for piston 44 and water cooling of the gate bushing 20 it was possible to maintain the following metal temperatures:
 1) mold stem distal end 51: 310-320 F;
 2) mold cavity 18: 260-270 F;
 3) stationary mold plate 12 (adjacent gate bushing 20): 215-225 F.

Examination and testing of product produced confirmed that burning and delamination was eliminated from the product part adjacent the sprue gate opening.

It should be understood that the invention may take other and varied forms from those described above and that such are intended to be protected in accordance with the following claims.

I claim:

1. A valve member including a body, a gate bushing having a channel to receive a fluent material to be dispensed and a valve stem with proximal and distal ends, said bushing having an opening forming a seat in communication with said channel and said body supporting said stem which incorporates a cavity extending along the length thereof to a point in close proximity with the distal end thereof such as to permit passage of heat exchange fluid therethrough, said member further incorporating a cylinder and movable piston positioned therein, said piston being connected to said valve stem and having opposite sides against which said heat exchange material acts to reciprocate the piston and wherein said valve stem includes at least one passage which intersects said cavity and connects with said cylinder on at least one side of and in at least one position of said piston.

2. A valve member according to claim 1 wherein said gate bushing further includes a coolant channel in juxtaposition with said seat.

3. A valve member according to claim 1 wherein said passage is aligned and in communication with a passageway in said piston said passageway opening to said cylinder.

4. In an injection molding machine including a hot runner device with a sprue channel for conveying liquefied plastic material from a pressure chamber to at least one heated nozzle, said at least one nozzle defining an injection gate within a mold plate and valve for alternately opening and closing said gate by means of a piston and cylinder arrangement and wherein said nozzle includes a gate bushing having a seat at one end thereof; a valve stem selectively engageable with said seat, and said stem having an interiorly positioned cavity extending along its length to a point in juxtaposition with said seat and interconnected with the cylinder of said arrangement.

5. In an injection molding machine according to claim 4 wherein said gate bushing further includes a coolant channel in juxtaposition with said seat.

6. In an injection molding machine according to claim 4 wherein said interiorly positioned cavity is connected with the cylinder of said piston and cylinder arrangement for carrying a fluid cooling medium between the point in juxtaposition with said seat and the cylinder where the cooling medium is an actuating fluid for the piston.

7. In an injection molding machine according to claim 4 wherein said nozzle includes a second channel extending through said bushing and defining said injection gate and seat, which second channel receives said liquefied plastic material, said valve stem being selectively reciprocally movable within the second channel into and out of engagement with said seat thereby opening and closing said gate.

8. In an injection molding machine according to claim 7 wherein said piston and cylinder arrangement is positioned in said valve and said piston is interconnected with and is adapted to reciprocate said valve stem.

9. In an injection molding machine according to claim 8 wherein said valve stem cavity has a tube supported therein and said tube extending substantially along the length of said cavity and being open to said cavity proximate the distal end of said valve stem, both said cavity and tube being connected with a cooling fluid conduit.

10. In an injection molding machine according to claim 9 wherein said tube and cavity are both interconnectable with said cylinder.

11. An injection molding method wherein a fluid plastic material is fed to a molding machine nozzle and valve gate assembly; said gate assembly is selectively opened and closed during each machine cycle by means of a fluid activant, and during said cycle said fluid activant is circulated in said assembly and functions as a cooling medium therein.

12. In an injection molding method according to claim 11 wherein said valve gate assembly includes a gate bushing and valve stem and said activant is circulated in said valve stem.

13. In an injection molding method according to claim 11 wherein said activant cooling medium is circulated only when said valve stem is positioned to open said gate assembly.

14. A valve member for a hot runner device with a sprue channel for conveying liquefied plastic material from a pressure chamber to at least one heated nozzle, said at least one nozzle defining an injection gate within a mold plate and at least one valve for alternately opening and closing said gate by means of a piston and cylinder arrangement and wherein said nozzle includes a gate bushing having a seat at one end thereof; a valve stem selectively engageable with said seat, and said stem having an interiorly positioned cavity extending along its length to a point in juxtaposition with said seat and interconnected with the cylinder of said arrangement.

* * * * *